US010379376B2

(12) United States Patent
Kuczewski et al.

(10) Patent No.: US 10,379,376 B2
(45) Date of Patent: Aug. 13, 2019

(54) WEARABLE ELECTRONIC DISPLAY

(71) Applicant: Kopin Corporation, Westborough, MA (US)

(72) Inventors: Lee A. Kuczewski, Brooklyn, NY (US); Declan Halpin, Seekonk, MA (US); Ernesto Carlos Martinez Villalpando, Shrewsbury, MA (US)

(73) Assignee: Kopin Corporation, Westborough, MA (US)

( * ) Notice: Subject to any disclaimer, the term of this patent is extended or adjusted under 35 U.S.C. 154(b) by 339 days.

(21) Appl. No.: 15/285,257

(22) Filed: Oct. 4, 2016

(65) Prior Publication Data
US 2017/0108714 A1    Apr. 20, 2017

Related U.S. Application Data (60) Provisional application No. 62/243,715, filed on Oct. 20, 2015.

(51) Int. Cl.
| | |
|---|---|
| *G02B 27/01* | (2006.01) |
| *G02C 5/22* | (2006.01) |
| *G02C 5/02* | (2006.01) |
| *G02C 5/14* | (2006.01) |

(52) U.S. Cl.
CPC ........... *G02C 5/22* (2013.01); *G02B 27/0176* (2013.01); *G02C 5/02* (2013.01); *G02C 5/146* (2013.01); *G02B 2027/0178* (2013.01)

(58) Field of Classification Search
USPC ............................ 351/60; 345/7–9; 2/13, 442
See application file for complete search history.

(56) References Cited

U.S. PATENT DOCUMENTS

| | | | |
|---|---|---|---|
| 4,704,000 | A | 11/1987 | Pekar |
| 4,865,438 | A | 9/1989 | Wada |
| 4,986,649 | A | 1/1991 | Smith |
| 5,892,564 | A | 4/1999 | Rahn |
| D432,508 | S | 10/2000 | Park et al. |
| 6,351,252 | B1 | 2/2002 | Atsumi et al. |
| 6,424,321 | B1 | 7/2002 | Ronzani et al. |

(Continued)

FOREIGN PATENT DOCUMENTS

| | | |
|---|---|---|
| DE | 202012003317 | 8/2012 |
| EP | 0 551 781 A1 | 7/1993 |

(Continued)

*Primary Examiner* — Robert E. Tallman
*Assistant Examiner* — Gary W O'Neill
(74) *Attorney, Agent, or Firm* — Hamilton, Brook, Smith & Reynolds, P.C.

(57) ABSTRACT

A wearable electronic display includes an eyewear frame having a front frame portion including a brow bar with lens frame rims extending from and below the brow bar. A display module can be mounted to the eyewear frame and have a microdisplay for generating images. The display module can have an image exit window positioned for directing viewable images to a user's eye. The display module can be positioned within a cavity in the front frame portion. A brow bar bracket can be mounted to a rear side of the brow bar. The brow bar bracket can have a shroud for covering the display module. The shroud can have a pupil aperture aligned with the exit window of the display module through which the user can view the viewable images.

16 Claims, 7 Drawing Sheets

(56) References Cited

U.S. PATENT DOCUMENTS

| | | |
|---|---|---|
| 6,978,478 B2 | 12/2005 | Urakawa et al. |
| D628,616 S | 12/2010 | Yuan |
| D671,590 S | 11/2012 | Klinar et al. |
| D680,152 S | 4/2013 | Olsson et al. |
| 8,446,676 B2 | 5/2013 | Sugihara et al. |
| D687,087 S | 7/2013 | Iurilli |
| 8,542,326 B2 | 9/2013 | MacNaughton et al. |
| D694,311 S | 11/2013 | Cho et al. |
| 8,643,568 B2 | 2/2014 | West et al. |
| 8,777,406 B2 | 7/2014 | Sugihara et al. |
| D710,928 S | 8/2014 | Heinrich et al. |
| D716,808 S | 11/2014 | Yeom et al. |
| D718,305 S | 11/2014 | Olsson et al. |
| D719,568 S | 12/2014 | Heinrich et al. |
| D719,569 S | 12/2014 | Heinrich et al. |
| D719,570 S | 12/2014 | Heinrich et al. |
| D719,952 S | 12/2014 | Kim et al. |
| D724,082 S | 3/2015 | Olsson et al. |
| D724,083 S | 3/2015 | Olsson et al. |
| D727,317 S | 4/2015 | Olsson et al. |
| D738,373 S | 9/2015 | Davies et al. |
| 9,841,603 B2 | 12/2017 | Halpin et al. |
| 2002/0159023 A1* | 10/2002 | Swab ............... H04W 56/0015 351/158 |
| 2003/0090439 A1 | 5/2003 | Spitzer et al. |
| 2005/0237271 A1 | 10/2005 | Yamamoto |
| 2010/0110368 A1 | 5/2010 | Chaum |
| 2010/0226017 A1* | 9/2010 | Spaller ............... G02B 27/0172 359/630 |
| 2010/0245754 A1 | 9/2010 | Matsumoto |
| 2010/0245757 A1 | 9/2010 | Sugihara et al. |
| 2010/0253904 A1 | 10/2010 | Jannard |
| 2012/0013843 A1 | 1/2012 | Jannard |
| 2012/0105740 A1 | 5/2012 | Jannard et al. |
| 2013/0044042 A1 | 2/2013 | Olsson et al. |
| 2013/0235331 A1 | 9/2013 | Heinrich |
| 2014/0266986 A1 | 9/2014 | Magyari |
| 2015/0301360 A1 | 10/2015 | Chow et al. |
| 2016/0223820 A1 | 8/2016 | Chow et al. |
| 2016/0246059 A1 | 8/2016 | Halpin et al. |

FOREIGN PATENT DOCUMENTS

| | | |
|---|---|---|
| JP | D1470899 | 6/2013 |
| TW | D132974 | 1/2010 |
| TW | D138236 | 12/2010 |
| WO | WO 2013/185224 A1 | 12/2013 |
| WO | WO 2014/093284 A1 | 6/2014 |
| WO | WO 2016/077696 A1 | 5/2016 |

* cited by examiner

WEARABLE ELECTRONIC DISPLAY

RELATED APPLICATION

This application claims the benefit of U.S. Provisional Application No. 62/243,715, filed on Oct. 20, 2015. The entire teachings of the above application are incorporated herein by reference.

BACKGROUND

Electronic or video eyewear in the prior art are typically big and bulky. The present invention can provide a wearable electronic display having a slim design that has the appearance similar to conventional eyeglasses

SUMMARY OF THE INVENTION

The present invention can provide a wearable electronic display including an eyewear frame having a front frame portion including a brow bar with lens frame rims extending from and below the brow bar. A display module can be mounted to the eyewear frame and have a microdisplay for generating images. The display module can have an image exit window positioned for directing viewable images to a user's eye. The display module can be positioned within a cavity in the front frame portion. A brow bar bracket can be mounted to a rear side of the brow bar. The brow bar bracket can have a shroud for covering the display module. The shroud can have a pupil aperture aligned with the exit window of the display module through which the user can view the viewable images.

In particular embodiments, the cavity in the front frame portion can be shaped for allowing tilting of the exit window of the display module downwardly. The eyewear frame can include left and right temple portions rotatably mounted to opposite sides of the brow bar bracket by respective hinges. Electronic components can be included with at least one of the temple portions, and with the brow bar and/or the brow bar bracket. The brow bar and/or the brow bar bracket can have at least one electrical contact point with the at least one of the temple portions, whereby the at least one electrical contact point is engaged when the at least one of the temple portions is in the open position for engaging power and/or data transfer, and disengaged when the at least one of the temple portions is in the closed position for disengaging power and/or data transfer.

The brow bar bracket can include a rear wall and a top wall. The top wall can form an upper front ledge extending forwardly from the rear wall across the front portion of the brow bar bracket, forming a recess for accepting an upper region of the front frame portion for securement thereto. A flexible electronic circuit can be positioned under the front ledge of the brow bar bracket. Flexible electronics can extend between the brow bar and/or brow bar bracket, and the at least one of the temple portions, for providing steady uninterrupted power and/or data transfer. A sheath can extend between the brow bar and/or brow bar bracket, and the at least one of the temple portions, for protectively housing the flexible electronics extending therebetween.

The present invention can also provide a wearable electronic display including an eyewear frame having a front frame portion including a brow bar with lens frame rims extending from and below the brow bar. A display module can be mounted to the eyewear frame and have a microdisplay for generating images. The display module can have an image exit window positioned for directing viewable images to a user's eye. The display module can be positioned within a cavity in the front frame portion. A brow bar bracket to be mounted to a rear side of the brow bar. The brow bar bracket can have a shroud for covering the display module. The shroud can have a pupil aperture aligned with the exit window of the display module through which the user can view the viewable images. The brow bar bracket can include a rear wall and a top wall. The top wall can form an upper front ledge extending forwardly from the rear wall across the front portion of the brow bar bracket that forms a recess for accepting the upper region of the front frame portion for securement thereto, thereby containing the display module within the brow bar bracket and the front frame portion assembly.

The present invention can also provide a method of using a wearable electronic display including wearing an eyewear frame having a front frame portion including a brow bar with lens frame rims extending from and below the brow bar. A display module can be used and mounted to the eyewear frame. The display module can have a microdisplay for generating images. The display module can have an image exit window positioned for directing viewable images to a user's eye. The display module can be positioned within a cavity in the front frame portion. A brow bar bracket can be used and mounted to a rear side of the brow bar. The brow bar bracket can have a shroud for covering the display module. The shroud can have a pupil aperture aligned with the exit window of the display module. The user's eye can look upwardly to the pupil aperture for viewing the viewable images passing through the pupil aperture.

In particular embodiments, the cavity in the front frame portion have a shape that can be used for allowing tilting of the exit window of the display module downwardly. Left and right temple portions can be worn and rotatably mounted to opposite sides of the brow bar bracket by respective hinges. Electronic components can be used with at least one of the temple portions, and with the brow bar and/or the brow bar bracket. The brow bar and/or the brow bar bracket can have at least one electrical contact point with the at least one of the temple portions, whereby the at least one electrical contact point is engaged when the at least one of the temple portions is in the open position for engaging power and/or data transfer, and disengaged when the at least one of the temple portions is in the closed position for disengaging power and/or data transfer.

The brow bar bracket can include a rear wall and a top wall. The top wall can form an upper front ledge extending forwardly from the rear wall across a front portion of the brow bar bracket, forming a recess. An upper region of the front frame portion can be secured within the recess of the brow bar bracket. A flexible electronic circuit can be used and positioned under the front ledge of the brow bar bracket. Flexible electronics can be used and extended between the brow bar and/or brow bar bracket, and the at least one of the temple portions, for providing steady uninterrupted power and/or data transfer. A sheath can be used and extended between the brow bar and/or brow bar bracket, and the at least one of the temple portions, for protectively housing the flexible electronics extending therebetween.

The present invention can also provide a method of using a wearable electronic display including wearing an eyewear frame having a front frame portion including a brow bar with lens frame rims extending from and below the brow bar. A display module can be used and mounted to the eyewear frame. The display module can have a microdisplay for generating images. The display module can have an image exit window positioned for directing viewable images to a user's eye. The display module can be positioned within a cavity in the front frame portion. A brow bar bracket can be used and mounted to a rear side of the brow bar. The brow bar bracket can have a shroud for covering the display module. The shroud can have a pupil aperture aligned with the exit window of the display module. The brow bar bracket can include a rear wall and a top wall. The top wall can form an upper front ledge extending forwardly from the rear wall across the front portion of the brow bar bracket that forms a recess for accepting an upper region of the front frame portion for securement thereto, thereby containing the display module within the brow bar bracket and the front frame portion assembly. The user's eye can look upwardly to the pupil aperture for viewing the viewable images passing through the pupil aperture.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

FIGS. 1-5 depict an embodiment of a wearable electronic display, viewer, spectacles, eyeglasses or eyewear 20. Electronic eyewear 20 can be a computer-integrated ophthalmic eyeglass or sunglass system, with a display or pupil optics module 2 for generating viewable images 22 along an optical axis O for viewing by an eye 23 of the user. The display module 2 and connected electrical components can be concealed or contained within the eyeglass frame 24 of the electronic eyewear 20 in a slim elegant design that appears similar to conventional eyeglasses. As a result, the user can view text, images, data, video, information, etc., and listen to audio, while wearing electronic eyewear 20, without being readily apparent to outside observers.

The frame 24 of the electronic eyewear 20 can include a front frame portion or frame chassis 3, having two lens frame, spectacle or eyeglass rims 26 extending from and below a brow bar or brow bar region or portion 28 of the frame chassis 3, that extends across the upper region or portion of the frame chassis 3. Nonprescription, prescription or sunglass lenses 30 can be mounted within rims 26. Nose pads 10 can be mounted to the rims 26. A modular brow bar or brow bar bracket 1 can be secured to the upper portion of the frame chassis 3 over the rear and top of the brow bar portion 28. In some embodiments, the brow bar bracket 1 can be considered part of the brow bar when assembled to the brow bar portion 28. The display module 2 can be enclosed or housed within the modular brow bar bracket 1/frame chassis 3 assembly, which can form a housing for the display module 2 when assembled together. The images 22 generated by the display module 2 can be viewed through a brow bar pupil aperture, window or opening 1b, in a modular brow bar shroud 1a of the modular brow bar bracket 1. Right 4 and left 7 side stems or temples can be pivotably or rotatably mounted to opposite sides of the modular brow bar bracket 1 by right 1c and left 1d brow bar hinges. Electrical components can be housed, contained or included in the right 4 and left 7 temples, and can include an electronic, electrical or circuit board 60, cables/wires/lines/circuits/electronics 64 which can be flexible, audio speakers 56 and batteries 62. Access to the electrical components in the temples 4 and 7 can be provided by right 5 and left 8 temple doors located on the inner sides of the right 4 and left 7 temples. The electrical components in the temples 4 and 7 can be electrically connected to electrical components contained within the module brow bar bracket 1/frame chassis 3 assembly, such as the display module 2 and a flexible electrical or electronic circuit 32. The modular brow bar bracket 1 and connected temples 4 and 7 can in some embodiments be a modular assembly including selected electrical components, that is mounted to the frame chassis 3.

Figure 5:
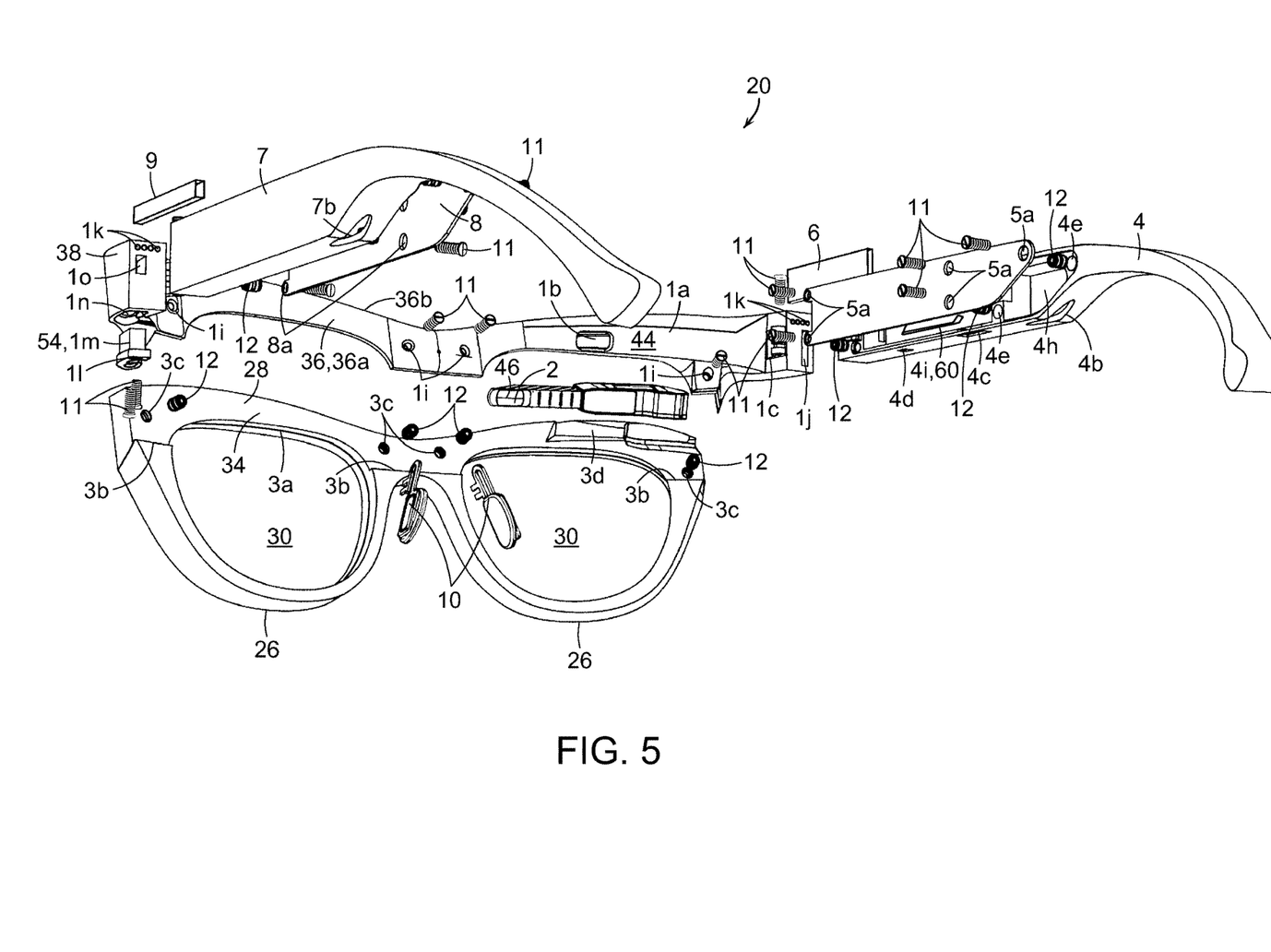
FIG. 5 is an exploded lower rear perspective view thereof.

Referring to FIG. 5, the rear of the brow bar portion 28 of the frame chassis 3 can have a recessed surface 34 extending laterally across the frame chassis 3 between opposite sides thereof, forming frame chassis ledges or shoulders 3b on the rear of the frame chassis 3 and the rims 26, for accepting and mating with the modular brow bar bracket 1. The ledges 3b can engage bottom surfaces of the modular brow bar bracket 1 for positioning, rigidity and/or stability. The modular brow bar bracket 1 can have a generally laterally extending main cross bracket body 36 with two legs 38 at opposite ends or sides that bend or curve rearwardly. Although the body 36 moving in the lateral direction can have curves or slight angles as shown, the body 36 can still be considered to extend generally laterally. The body 36 can have a generally laterally extending rear wall, surface, face or portion 36a, and a generally laterally extending top or upper wall, surface, face or portion 36b which can extend forwardly from the rear wall 36a and form an upper front ledge or shoulder 36c that terminates on opposite ends at recess sidewalls 36d. This can form a recess 40 in the front of the body 36 of the modular brow bar bracket 1 bounded by the rear wall 36a, the ledge 36c of the top wall 36b, and the recess sidewalls 36d, on the rear, top and sides, respectively. The recess 40 can extend to or into the legs 38 of the modular brow bar bracket 1. The recess 40 is open at the bottom and front, and can mate with the rear, top and sides of the brow bar portion 28 of the frame chassis 3, on four surfaces. The bottom of the modular brow bar bracket 1 engages the ledges 3b thereby providing fifth mating surfaces. The modular brow bar bracket 1 can be secured to the frame chassis 3 by screws 11 through assembly holes 1i, and into holes such as threaded micro insert holes 3c. This can secure and trap the top of the frame chassis 3 within the recess 40 of the modular brow bar bracket 1 in a rigid manner. The recess 40 and walls 36a, 36b and 36c can be contoured or curved to fit or follow the contours or curves of the mating surfaces of the frame chassis 3.

Figure 7:
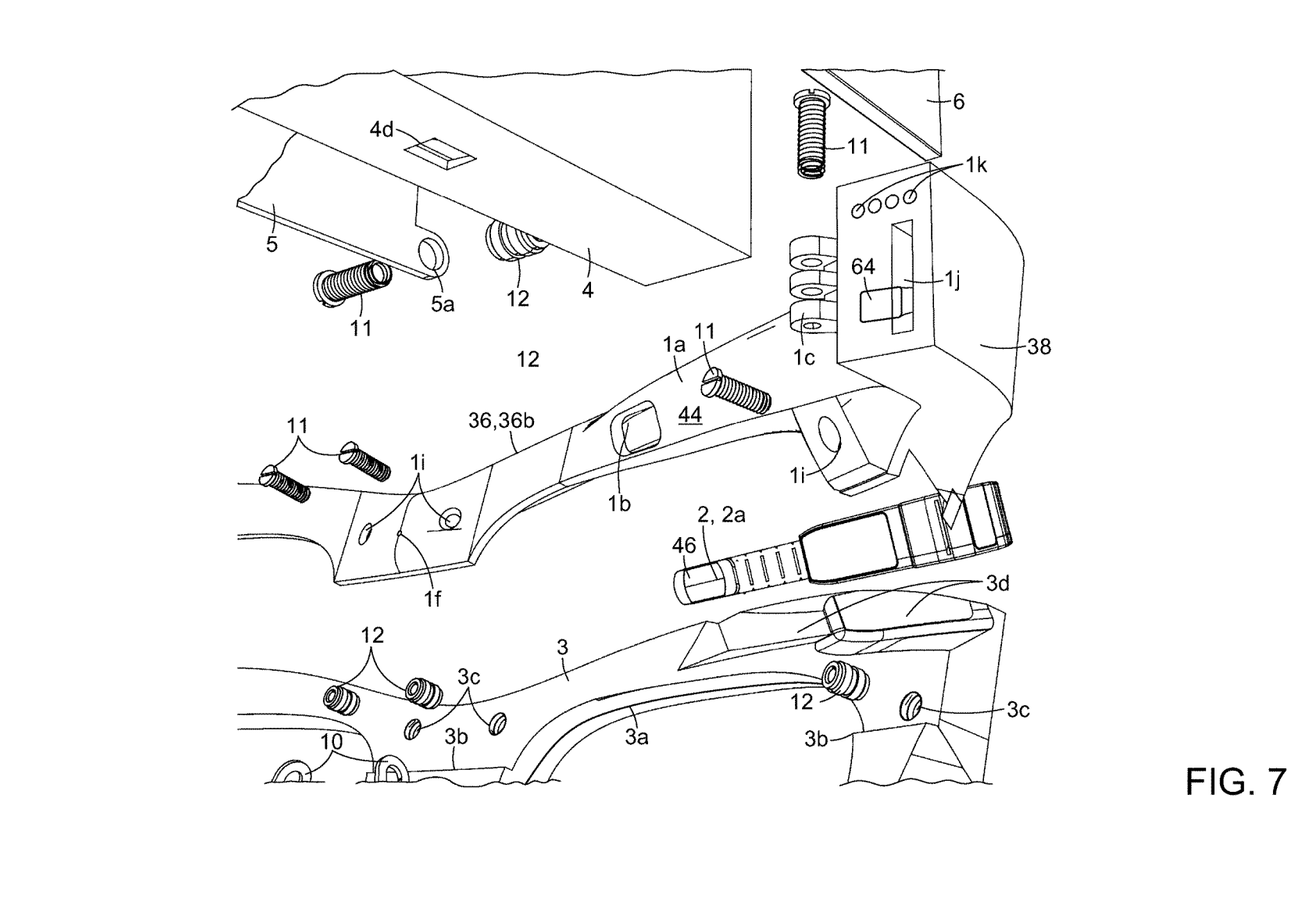
FIG. 7 is an exploded view of a portion thereof from the rear.

The recessed surface 34 of the frame chassis 3 can include a display cavity or chassis cavity for pupil display module 3d formed on one side of the brow bar portion 28 above lens 30, such as for the right eye 23 as shown in FIGS. 5 and 7. The display cavity 3d can be shaped to accommodate the shape of the display module 2 and allow tilting or to tilt the display module 2 in a downwardly direction or angle for alignment with a user's eye 23. As can be seen, the display module 2 can have a complex shape, and the display cavity 3d can be shaped with recesses that accommodate shape of the display module 2.

Figure 1:
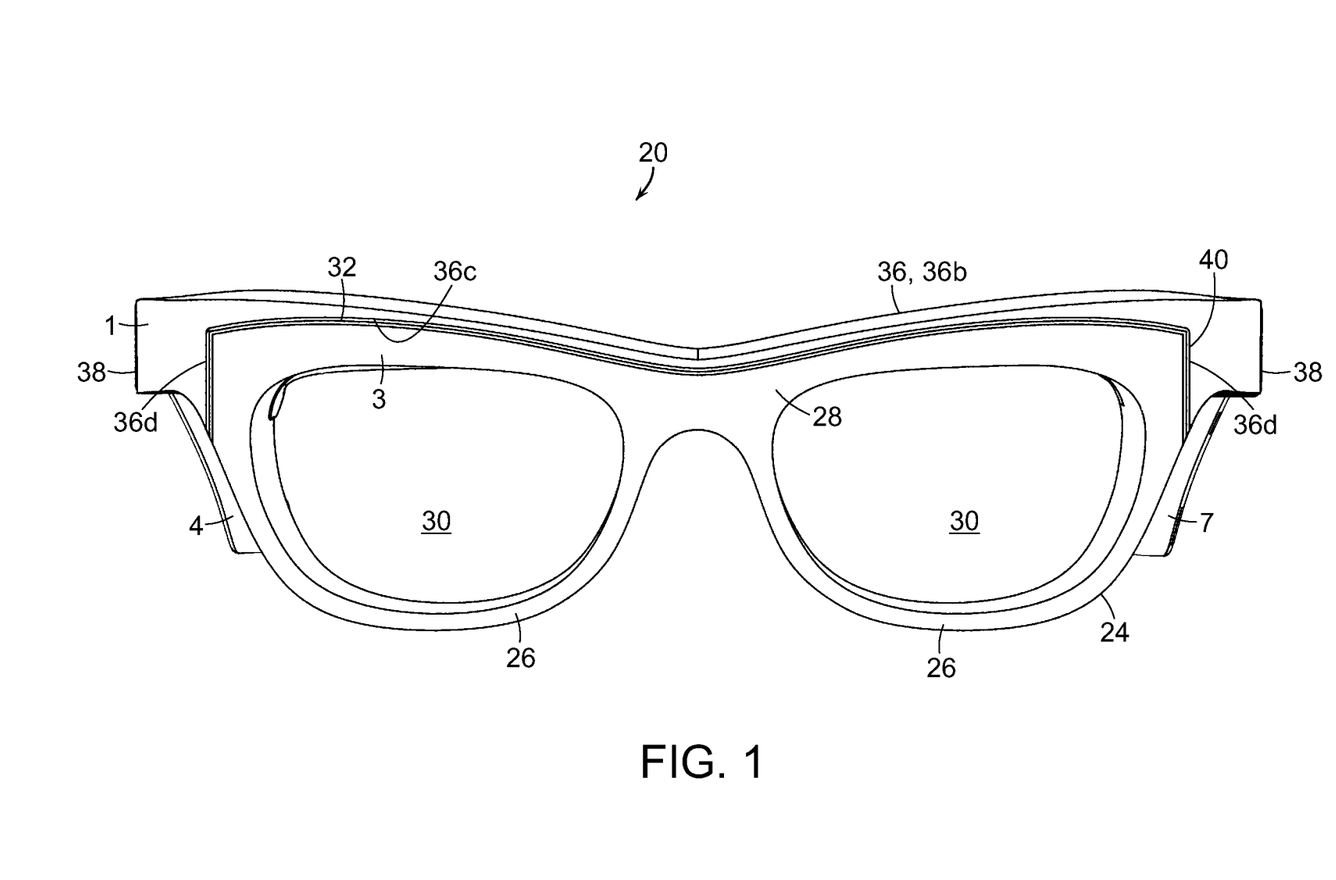
FIG. 1 is a front view of an embodiment of a wearable electronic display in the present invention.
Figure 2:
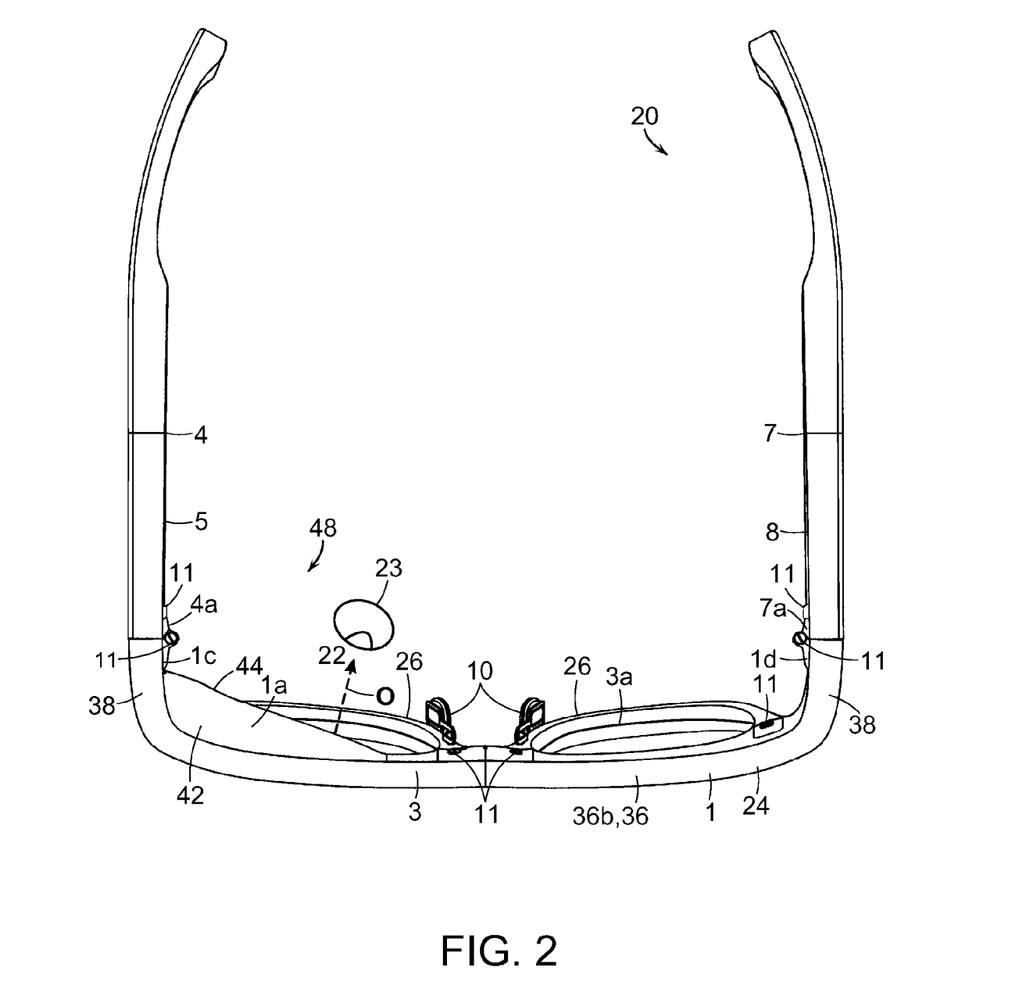
FIG. 2 is a top view thereof.
Figure 3:
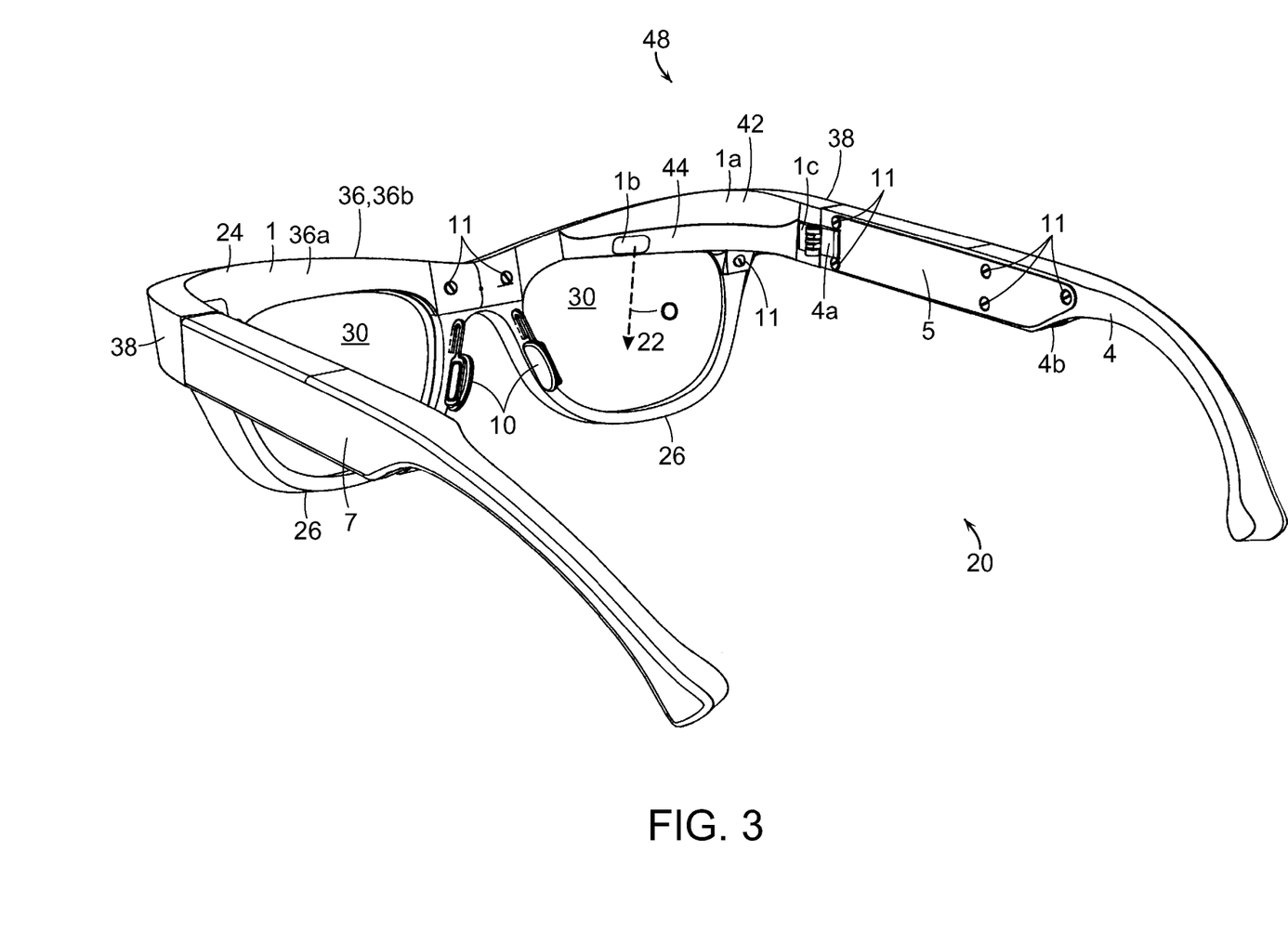
FIG. 3 is a rear perspective view thereof.
Figure 4:
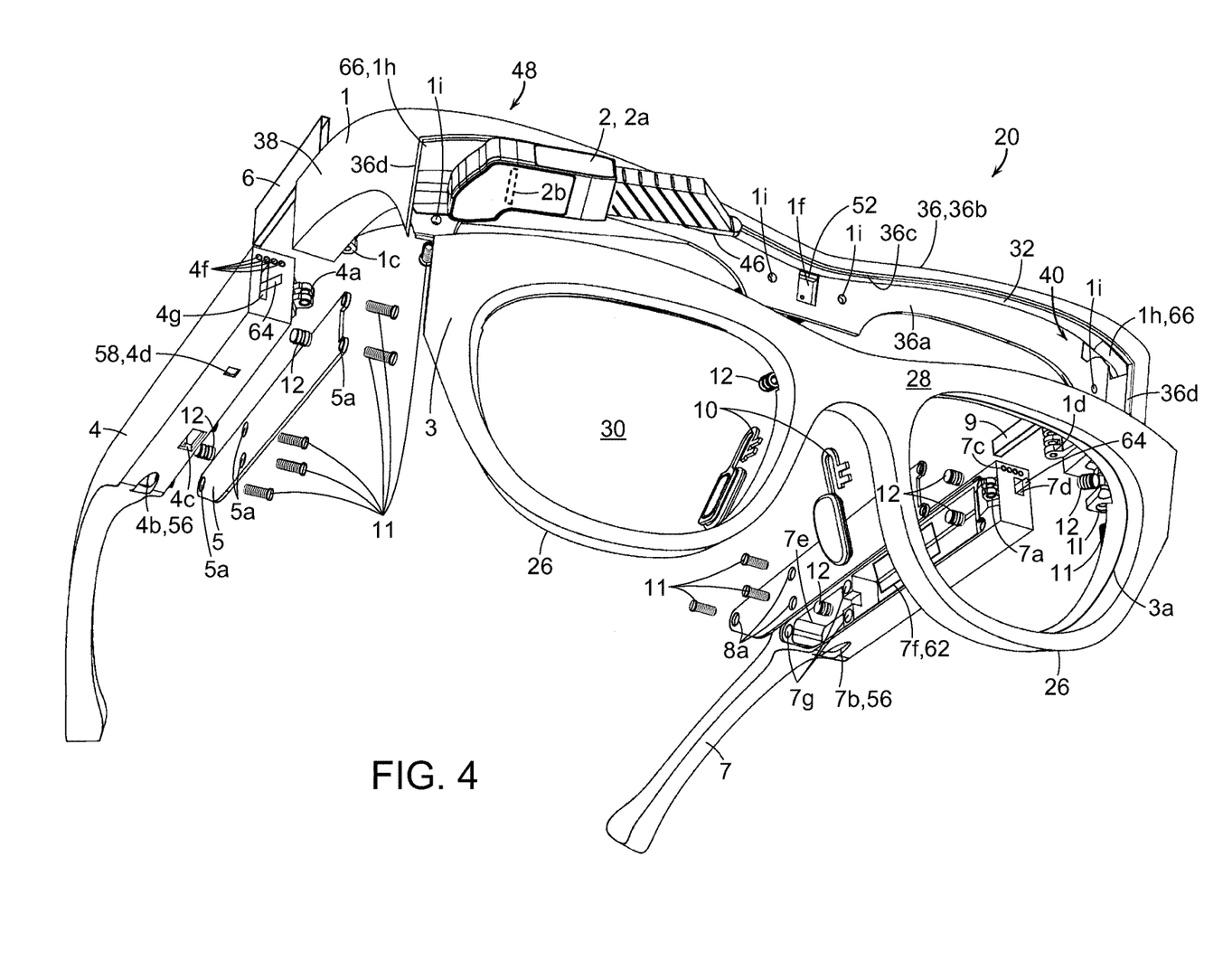
FIG. 4 is an exploded lower front perspective view thereof.

The display module 2 can have thin, small, compact or miniature optics to bring the image 22 generated or from an active matrix electronic display or micro-display 2b (which can be a display less than 1 inch diagonal), through an optical image exit window 46 to the eye or eyeball 23 of a user to form virtual images on the retina (FIGS. 2 and 4). The display module 2 can have a thickness that is compatible with, or have similar or comparable dimensions as the brow bar portion 28 of frame chassis 3. The display module 2 can have a housing 2a that is shaped as a generally angled, angular, bent, folded or corner shaped, member or structure, that contains the micro-display 2b and backlight source, as well as any lenses, mirrors or prisms (if needed), can be positioned into a corner 48 of the frame 24 or modular brow bar bracket 1. The image exit window 46 of the display module 2 can be located near the center of the top of rim 26. The image exit window 46 can be positioned near or at the end of an extended or elongate portion of the housing 2a. The display module 2 can be similar to embodiments disclosed in U.S. patent application Ser. No. 14/541,662, filed Nov. 14, 2014, the contents of which are incorporated herein in its entirety by reference.

Figure 6:
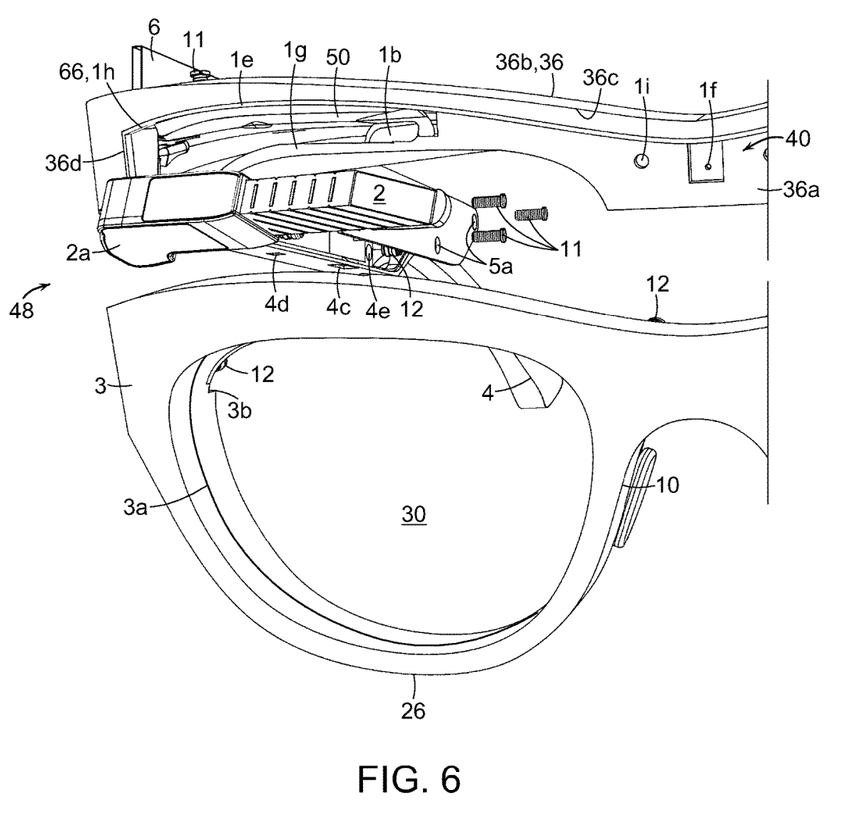
FIG. 6 is an exploded view of a portion thereof from the front.

The modular brow bar bracket 1 can have a modular brow bar shroud, guard, shield, enclosure or housing 1a on one corner 48 extending over the display cavity 3d above one rim 26, such as for the right eye 23. The shroud 1a can be opaque, and protectively house the display module 2, surrounding and enclosing the display module 2, together with the frame chassis 3 when the modular brow bar bracket 1 is mounted to the frame chassis 3, forming a housing assembly therewith. The shroud 1a can extend across or along the brow bar portion 28 of the frame chassis 3 above lens 30 from the leg 38 of the modular brow bar bracket 1 to a location beyond the center of rim 26 and lens 30. The top surface 42 of the shroud 1a can be generally flat. The rear surface 44 of the shroud 1a can angle forwardly moving from the leg 38 towards the center of frame chassis 3, terminating beyond the midpoint of lens 30, forming a generally triangular shape when viewed from the top (FIG. 2). The rear angled surface 44 can have about the same height or thickness as the brow bar portion 28, blending into the appearance of the frame 24, frame chassis 3 and/or the temples 4 and 7, so as to be hidden from outside observers. The brow bar pupil aperture 1b can be formed in the rear surface 44 of the shroud 1a for alignment with the image exit window 46 of the display module 2, and can be located near the center of the top of rim 26. The front of the modular brow bar bracket 1 and shroud 1a can have a brow bar chassis flange 1e (FIG. 6) for engaging and mating with the top of the frame chassis 3. The the interior 50 of the shroud 1a can have an interior surface that is shaped to accommodate the display module 2. The bottom of the shroud 1a can have a bottom securing flange for the display module or pupil 1g for securing the display module 2 in place, and can be shaped to form the top of the rim 26. The display module 2 can be fixed in a downwardly tilted orientation or direction. In some embodiments, the lateral position for interpupillary distance and amount of tilt of the display module 2 and exit window 46 can be adjusted, for example by adjustment mechanisms positioned within the modular brow bar bracket 1 and/or the frame chassis 3, or spaces in between.

The flexible electronic circuit 32 can be enclosed, housed, positioned or sandwiched between the top of the frame chassis 3 and the bottom of the front ledge 36c of the modular brow bar bracket 1. As can be seen in FIGS. 2 and 4, the top surface of the frame chassis 3 and mating bottom surface of the front ledge 36c curve slightly upwardly and downwardly over each rim 26 and lense 30 in a gentle wavelike shape having two convex curves connected together by a concave curve when viewed from the top. Therefore, the flexible electronic circuit 32 when sandwiched therebetween, takes on a corresponding wavelike shape with two outer convex curves connected together by a central concave curve when viewed from the top. The flexible electronic circuit 32 can be bonded, secured or adhered to the bottom or underside of the front ledge 36c and/or to the top of the frame chassis 3. The display module 2 can be electrically connected to the flexible electronic circuit 32 as well as other desired electrical components. Additional electrical components can be included in the modular brow bar bracket 1, such as a microphone 52 (FIG. 4) positioned within a brow bar microphone hole if in the center of the modular brow bar bracket 1, and a switch 54 in a switch holder 1m that can be positioned within a brow bar switch holder cavity In (FIG. 5) in the bottom of a leg 38. The switch 54 can provide on/off capabilities or other desired capabilities.

The rearwardly facing end faces of the legs 38 of the modular brow bar bracket 1 can include one or more, or a series of integrated electrical contacts or contact points 1k (FIGS. 5 and 7) embedded or cast therein, which can engage opposing mating integrated contacts or contact points 4f on the forwardly facing end faces of temple 4, and opposing mating integrated contacts or contact points 7c on temple 7, when the temples 4 and 7 are rotated with hinges 1c/4a and 1d/7a in the opened position for wearing. Electronics contact pathways 1h can extend from contact points 1k through legs 38 to recess 40 of modular brow bar bracket 1 to allow electrical components to extend therethrough, such as electrical cables/wires/lines/circuits/electronics 66 (which can be flexible) to the flexible electronic circuit 32, or to allow circuit 32 to extend therethrough. In some embodiments, some of all of electrical components 32, 64 and 66 can be the same or similar components, and in other embodiments can be different components. The integrated contact points 1k, 4f and 7c, when in electrical contact with corresponding mating contacts, can allow transmission of data and/or power between the temples 4 and 7 and the legs 38 of the modular brow bar bracket 1, to the desired components in the frame chassis 3 and modular brow bar bracket 1, which can include the cables/wires/lines/circuits/electronics 66, flexible electronic circuit 32, display module 2 microphone 52 and switch 54. When the temples 4 and 7 are folded inwardly about hinges 1c/4a and 1d/7a in a closed position, the contact points 1k disengage from contact points 4f and 7c. This can allow power and/or data transfer to be turned on when the temples 4 and 7 are opened, for wearing, and turned off when closed for storage. In some embodiments, flexible electrical circuits, lines or cables 64 can extend between the temples 4 and 7 and legs 38 of the modular brow bar bracket 1 for electrical connection to desired electrical components therein, in addition to or instead of the contact points 1k, 4f and 7c, to provide steady uninterrupted power/ data transfer. Right 6 and left 9 temple sheaths can extend from and between the legs 38 and the right 4 and left 7 temples through respective right side brow bar sheath cavity 1j (FIG. 5) and right 4g temple sheath cavity (FIG. 4), and left side brow bar sheath cavity 1o and left temple sheath cavity 7d for housing, protecting and securing any electronics, circuits, cables or wires 64 traveling or extending between the legs 38 and the temples 4 and 7, through cavities 1j, 4g, 1o and 7d. The right 6 and left sheaths 9 can be formed of flexible material to bend when the temples 4 and 7 are opened and closed.

The right temple 4 can include a right temple speaker hole 4b (FIG. 4) with a right speaker 56, a right temple charging hole or connector 4c, a right temple reset switch hole 4d with a reset switch 58, and a right temple board cavity 4i (FIG. 5) with a circuit board 60. The left temple 7 can have a left temple speaker hole 7b with a left speaker 56, and a left temple battery cavity 7f with a battery 62.

Further description of embodiments in the present invention follows. Some embodiments can be described as a computer-integrated ophthalmic eyeglass or sunglass system, with an embedded pupil microdisplay, concealed electronics and a modular brow bar or brow bar bracket 1. The invention can allow the user to view a concealed and embedded microdisplay that is located in the brow bar of an ophthalmic eyeglass or sunglass frame 24. Flexible circuits with additional components may be embedded in the brow bar during the manufacturing process, allowing for a fully concealed modular system. Electronic contact points between the brow bar and temples can also allow for a novel way of transmitting information when the glasses are opened (contacts touching), or closed (contacts not touching).

The eyeglass frame 24 can be made up of the following components identified by the adjacent reference numerals:
1 Modular Brow Bar
2 Pupil Optics Module
3 Frame Chassis
4 Right Temple
5 Right Temple Door
6 Right Temple Sheath
7 Left Temple
8 Left Temple Door
9 Left Temple Sheath
10 Nose Pads
11 Assembly Screws
12 Ultrasonic Micro-Threaded Inserts
Additional features and components are identified by the adjacent reference numerals.
1a Modular Brow Bar Shroud
1b Brow Bar Pupil Aperture
1c Brow Bar Right Hinge
1d Brow Bar Left Hinge
1e Brow Bar Chassis Flange
1f Brow Bar Microphone Hole
1g Securing Flange for Pupil
1h Electronics Contact Pathway
   1i Brow Bar Assembly Hole
   1j Right side Brow Bar Sheath Cavity
   1k Integrated Brow Bar Contact Points
1l Switch Holder Holes
1m Switch Holder
1n Brow Bar Switch Holder Cavity
1o Left Side Brow Bar Sheath Cavity
3a Frame chassis Lens Bevel
3b Frame Chassis Ledge
3c Threaded Micro Insert Holes
3d Chassis Cavity for Pupil
4a Right Temple Hinge
4b Right Temple Speaker Hole
4c Right Temple Charging Hole
4d Right Temple Reset Switch Hole
4e Right Temple Insert Holes
4f Integrated Contact Points (Rt.)
4g Right Temple Sheath Cavity
4h Right Temple Speaker Cavity
4i Right Temple Board Cavity
5a Right Temple Door Holes
7a Left Temple Hinge
7b Left Temple Speaker
7c Integrated Contacts Points (Lf.)
7d Left Temple Sheath Cavity
7e Left Temple Speaker Cavity
7f Left Temple Battery Cavity
7g Left Temple Insert Holes
8a Left Temple Door Holes Modular Brow Bar 1: The modular brow bar or brow bar bracket 1 can be a primary means by which power and electronic data are transferred between the two temples 4 and 7. A flexible electronic circuit 32 may be adhered to the underside of the top face 36b of the brow bar 1 and exit the brow bar 1 via the left and right sheath cavities 1o and 1j. Alternatively, or in combination, fully embedded flexible electronics may be cast into the brow bar 1 with integrated contact points 1k exiting the brow bar 1 near the hinge. These integrated contact points 1k on both sides of the brow bar 1 may allow transmission of data or power when in contact with the integrated contact points of the right and left temple 4f and 7c. In addition to supporting the electronics, the brow bar 1 can conceal the pupil module 2 by a securing flange 1g and allows the wearer to view the microdisplay via the brow bar pupil aperture 1b. The frame chassis 3 can be secured into place with the brow bar 1 via the chassis flange 1e, assembly screws 11 and ultrasonic micro-threaded inserts 12. The area near the contact pathway 1h may also accommodate motion mechanisms for customizing the interpupillary distance of the micro display.

Pupil Optics Module 2: The pupil optics module or mechanism 2 can house the optics, electronics, and micro display. The pupil mechanism also may house cables, flexes, or wires which exit from its housing into the electronics contact pathway 1h. Any wiring 64 which exits the brow bar 1 can be concealed in the right and left sheaths 6 and 9 and enter into the right and left temples 4 and 7 via the sheath cavities.

Frame Chassis 3: The frame chassis 3 can be ophthalmically constructed to accommodate prescriptive lenses, adjustable silicone nose pads 10 and modular brow bar 1. The ultrasonic micro-threaded fasteners 12 can be inserted into the holes 3c via vibration welding, and the brow bar 1 can be stabilized via the chassis ledge 3b and secured to the brow bar 1 by assembly screws 11.

Right Temple 4: The right temple 4 can accommodate the electronic board 60, cables 64, and a speaker 56. When positioned in the open direction of wearing, the integrated contact points 4f can come in contact with the integrated contact points of the brow bar 1k, engaging power or data transfer. When in the closed position (temples folded inward), the contact points can disengage. This may lead to something as simple as the power turning on when placed on the head, and turning off when stowed. In addition to data or power transfer from the contact points, flexible circuits can be utilized for steady uninterrupted power/data transfer. The electronics 64 can exit the temple via the sheath cavity 4g and travel into the temple sheath and continue into the brow bar sheath cavity 1*j*. The right temple 4 can contain a hinge 4*a* which connects to the brow bar 1 for securing.

Right Temple Door 5: The right temple door 5 can secure and protect the electronics therein from exposure. The door can be secured via assembly screws 11.

Right Temple Sheath 6: The right temple sheath 6 can protect, conceal and secure any electronics 64 traveling from the temple 4 to the brow bar 1.

Left Temple 7: The left temple 7 can accommodate the battery 62, speaker 56 and cables/wires 64 traveling to and from the brow bar 1. When positioned in the open direction of wearing, the integrated contact points 7*c* can come in contact with the integrated contact points of the brow bar 1*k*, engaging power or data transfer. When in the closed position (temples folded inward), the contact points can disengage. This may lead to something as simple as the power turning on when placed on the head, and turning off when stowed. In addition to data or power transfer from the contact points, flexible circuits can be utilized for steady uninterrupted power/data transfer. The electronics 64 can exit the temple via the sheath cavity 7*d* and travel into the temple sheath 9 and continue into the brow bar sheath cavity 1*o*. The left temple 7 can contain a hinge 7*a* which connects it to the brow bar 1 for securing.

Left Temple Door 8: The left temple door 8 can secure and protect the electronics therein from exposure. The door can be secured via assembly screws 11.

Left Temple Sheath 9: The left temple sheath 9 can protect, conceal and secure any electronics 64 traveling from the temple 7 to the brow bar 1.

Nose Pads 10: The nose pads 10 can be adjustable and sunk into the frame chassis 3.

Assembly Screws 11: The assembly screws 11 can ensure a rigid connection between all components.

Ultrasonic Micro-Threaded Inserts 12: The ultrasonic micro-threaded inserts 12 can be vibration welding into position and facilitate a secure connection between all components.

While this invention has been particularly shown and described with references to example embodiments thereof, it will be understood by those skilled in the art that various changes in form and details may be made therein without departing from the scope of the invention encompassed by the appended claims.

What is claimed is:

1. A wearable electronic display comprising:
    an eyewear frame having a front frame portion including a brow bar with lens frame rims extending from and below the brow bar;
    a display module mounted to the eyewear frame having a microdisplay for generating images, the display module having an image exit window positioned for directing viewable images to a user's eye, the display module being positioned within a cavity in the front frame portion; and
    a brow bar bracket mounted to a rear side of the brow bar, the brow bar bracket having a shroud for covering the display module, the shroud having a pupil aperture aligned with the exit window of the display module through which the user can view the viewable images, the brow bar bracket including a rear wall and a top wall, the top wall forming an upper front ledge extending forwardly from the rear wall across a front portion of the brow bar bracket between opposite side walls, forming a recess having an open bottom and front for accepting and trapping an upper region of the front frame portion with the rear, top and side walls of the brow bar bracket for securement thereto.

2. The wearable electronic display of claim 1 in which the cavity in the front frame portion is shaped for allowing tilting of the exit window of the display module downwardly.

3. The wearable electronic display of claim 1 in which the eyewear frame includes left and right temple portions rotatably mounted to opposite sides of the brow bar bracket by respective hinges.

4. The wearable electronic display of claim 3 in which electronic components are included with at least one of the temple portions, and with the brow bar and/or the brow bar bracket, the brow bar and/or the brow bar bracket having at least one electrical contact point with the at least one of the temple portions, whereby the at least one electrical contact point is engaged when the at least one of the temple portions is in the open position for engaging power and/or data transfer, and disengaged when the at least one of the temple portions is in the closed position for disengaging power and/or data transfer.

5. The wearable electronic display of claim 4 further comprising flexible electronics extending between the brow bar and/or brow bar bracket, and the at least one of the temple portions, for providing steady uninterrupted power and/or data transfer.

6. The wearable electronic display of claim 5 further comprising a sheath extending between the brow bar and/or brow bar bracket, and the at least one of the temple portions, for protectively housing the flexible electronics extending therebetween.

7. The wearable electronic display of claim 1 further comprising a flexible electronic circuit positioned under the front ledge of the brow bar bracket.

8. A wearable electronic display comprising:
    an eyewear frame having a front frame portion including a brow bar with lens frame rims extending from and below the brow bar;
    a display module mounted to the eyewear frame having a microdisplay for generating images, the display module having an image exit window positioned for directing viewable images to a user's eye, the display module being positioned within a cavity in the front frame portion; and
    a brow bar bracket mounted to a rear side of the brow bar, the brow bar bracket having a shroud for covering the display module, the shroud having a pupil aperture aligned with the exit window of the display module through which the user can view the viewable images, the brow bar bracket including a rear wall and a top wall, the top wall forming an upper front ledge extending forwardly from the rear wall across a front portion of the brow bar bracket between opposite side walls, forming a recess having an open bottom and front for accepting and trapping an upper region of the front frame portion with the rear, top and side walls of the brow bar bracket for securement thereto, thereby containing the display module within the brow bar bracket and the front frame portion assembly.

9. A method of using a wearable electronic display comprising:
    wearing an eyewear frame having a front frame portion including a brow bar with lens frame rims extending from and below the brow bar;
    using a display module mounted to the eyewear frame, the display module having a microdisplay for generating images, the display module having an image exit window positioned for directing viewable images to a user's eye, the display module being positioned within a cavity in the front frame portion;

using a brow bar bracket mounted to a rear side of the brow bar, the brow bar bracket having a shroud for covering the display module, the shroud having a pupil aperture aligned with the exit window of the display module, the brow bar bracket including a rear wall and a top wall, the top wall forming an upper front ledge extending forwardly from the rear wall across a front portion of the brow bar bracket between opposite side walls, forming a recess having an open bottom and front for accepting and trapping an upper region of the front frame portion with the rear, top and side walls of the brow bar bracket for securement thereto; and looking upwardly with the user's eye to the pupil aperture for viewing the viewable images passing through the pupil aperture.

10. The method of claim 9 further comprising using the cavity in the front frame portion for allowing tilting of the exit window of the display module downwardly.

11. The method of claim 9 further comprising wearing left and right temple portions rotatably mounted to opposite sides of the brow bar bracket by respective hinges.

12. The method of claim 11 further comprising using electronic components with at least one of the temple portions, and with the brow bar and/or the brow bar bracket, the brow bar and/or the brow bar bracket having at least one electrical contact point with the at least one of the temple portions, whereby the at least one electrical contact point is engaged when the at least one of the temple portions is in the open position for engaging power and/or data transfer, and disengaged when the at least one of the temple portions is in the closed position for disengaging power and/or data transfer.

13. The method of claim 12 further comprising using flexible electronics extending between the brow bar and/or brow bar bracket, and the at least one of the temple portions, for providing steady uninterrupted power and/or data transfer.

14. The method of claim 13 further comprising using a sheath extending between the brow bar and/or brow bar bracket, and the at least one of the temple portions, for protectively housing the flexible electronics extending therebetween.

15. The method of claim 9 further comprising using a flexible electronic circuit positioned under the front ledge of the brow bar bracket.

16. A method of using a wearable electronic display comprising:

wearing an eyewear frame having a front frame portion including a brow bar with lens frame rims extending from and below the brow bar;

using a display module mounted to the eyewear frame, the display module having a microdisplay for generating images, the display module having an image exit window positioned for directing viewable images to a user's eye, the display module being positioned within a cavity in the front frame portion;

using a brow bar bracket mounted to a rear side of the brow bar, the brow bar bracket having a shroud for covering the display module, the shroud having a pupil aperture aligned with the exit window of the display module, the brow bar bracket including a rear wall and a top wall, the top wall forming an upper front ledge extending forwardly from the rear wall across a front portion of the brow bar bracket between opposite side walls, forming a recess having an open bottom and front for accepting and trapping an upper region of the front frame portion with the rear, top and side walls of the brow bar bracket for securement thereto, thereby containing the display module within the brow bar bracket and the front frame portion assembly; and looking upwardly with the user's eye to the pupil aperture for viewing the viewable images passing through the pupil aperture.

\* \* \* \* \*